(12) United States Patent
Wu et al.

(10) Patent No.: US 6,636,680 B2
(45) Date of Patent: Oct. 21, 2003

(54) OPTICAL FIBER CABLE HOLDER

(75) Inventors: Kun-Tsan Wu, Tu-Chen (TW); Shang Chin Liao, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 24 days.

(21) Appl. No.: 10/084,564

(22) Filed: Feb. 26, 2002

(65) Prior Publication Data

US 2003/0086676 A1 May 8, 2003

(30) Foreign Application Priority Data

Nov. 7, 2001 (TW) ..................................... 90219102 U

(51) Int. Cl.[7] ................................................. G02B 6/00
(52) U.S. Cl. ......................... 385/137; 385/135; 385/136
(58) Field of Search ................................. 385/137, 135, 385/136, 134, 81, 86, 87; 248/68.1

(56) References Cited

U.S. PATENT DOCUMENTS 5,149,027 A * 9/1992 Weber ........................ 248/68.1
5,530,785 A * 6/1996 Sakamota et al. .......... 385/136
5,566,268 A * 10/1996 Radliff et al. ............... 385/137

* cited by examiner

Primary Examiner—Phan T. H. Palmer
(74) Attorney, Agent, or Firm—Wei Te Chung

(57) ABSTRACT

An optical fiber cable holder (9) includes a main body (1) and a coupler (3). The main body comprises a holding member (11) and a fixing member (12). The holding member comprises a base portion (113), and a pair of holding arms (114) extending upwardly from opposite sides of the base portion. Each holding arm has a gradual bend at a terminal portion thereof. A receiving opening (116) is defined between the terminal portions to receive optical fiber cables (4) therethrough. The fixing member includes a support panel (121), a pivot portion (122) depending from support panel, a stop chassis (124) depending from the pivot portion, and an annular groove (123) being defined between the pivot portion and the stop chassis. The coupler is resiliently secured in the groove to retain the main body on a base (2). The holder is thereby rotatably fixed on the base, and prevents excessive bending or pulling of fiber cables retained in the holder.

12 Claims, 5 Drawing Sheets

OPTICAL FIBER CABLE HOLDER

BACKGROUND OF THE INVENTION

1. Field of the Invention

The present invention relates to optical fiber cable holders, and more particularly to an optical fiber cable holder rotatably attached to a base.

2. Description of the Related Art

In optical transmission networks, communication is performed by light transmitting devices connected by optical fiber cables. Cable holders retain the cables in position between the light transmitting devices. Each cable generally comprises a core bundle of optical fibers made of frangible quartz glass, and an outer cladding protecting the core. When the position of a light transmitting device in a network is changed, the cables are readily bent. However, excessive bending causes leakage of light from the optical fibers, and even breakage of the optical fibers.

Conventional cable holders are widely used for electrical cables. U.S. Pat. No. 5,149,027 discloses a snap fit cable holder having a U-shaped configuration. Two legs each have snap fit projections on both insides and outsides thereof, the projections being at different heights relative to a support base. Cables are positioned in a space between the holder and the support base. The holder accommodates varying amounts and varying sizes of cables. However, the holder does not prevent excessive bending of cables.

U.S. Pat. No. 5,530,785 discloses an optical fiber cable fixing structure. The structure comprises an arcuate inner peripheral surface for contacting a first cable holding member secured to a fixing member, and an arcuate inner peripheral surface for contacting a side surface of an optical fiber cable. A second cable holding member is mounted on the fixing member, for sliding toward and away from the first cable holding member. The second cable holding member has an arcuate second inner peripheral surface for contacting a side surface of the cable, and stopper means adapted to removably fix the second cable holding member in any desired position. However, the fixing structure does not prevent excessive bending of cables.

In view of the above, there is a need for an improved holder which can effectively prevent excessive bending or pulling of optical fiber cables.

SUMMARY OF THE INVENTION

Therefore, an object of the present invention is to provide a rotatable optical fiber cable holder that prevents excessive bending or pulling of cables.

To achieve the above-mentioned object, an optical fiber cable holder in accordance with the present invention includes a main body and a coupler. The main body includes a holding member and a fixing member. The holding member comprises a base portion, and a pair of holding arms extending upwardly from opposite sides of the base portion. Each holding arm has a gradual bend at a terminal portion thereof. A receiving opening is defined between the terminal portions to receive optical fiber cables therethrough. The fixing member includes a support panel, a pivot portion depending from support panel, a stop chassis depending from the pivot portion, and an annular groove defined between the pivot portion and the stop chassis. The coupler is resiliently secured in the groove to retain the main body on a base. The holder is thereby rotatably fixed on the base, and prevents excessive bending or pulling of fiber cables retained in the holder.

Other objects, advantages and novel features of the invention will become more apparent from the following detailed description when taken in conjunction with the accompany drawings, in which:

DETAILED DESCRIPTION OF THE INVENTION

Figure 1:
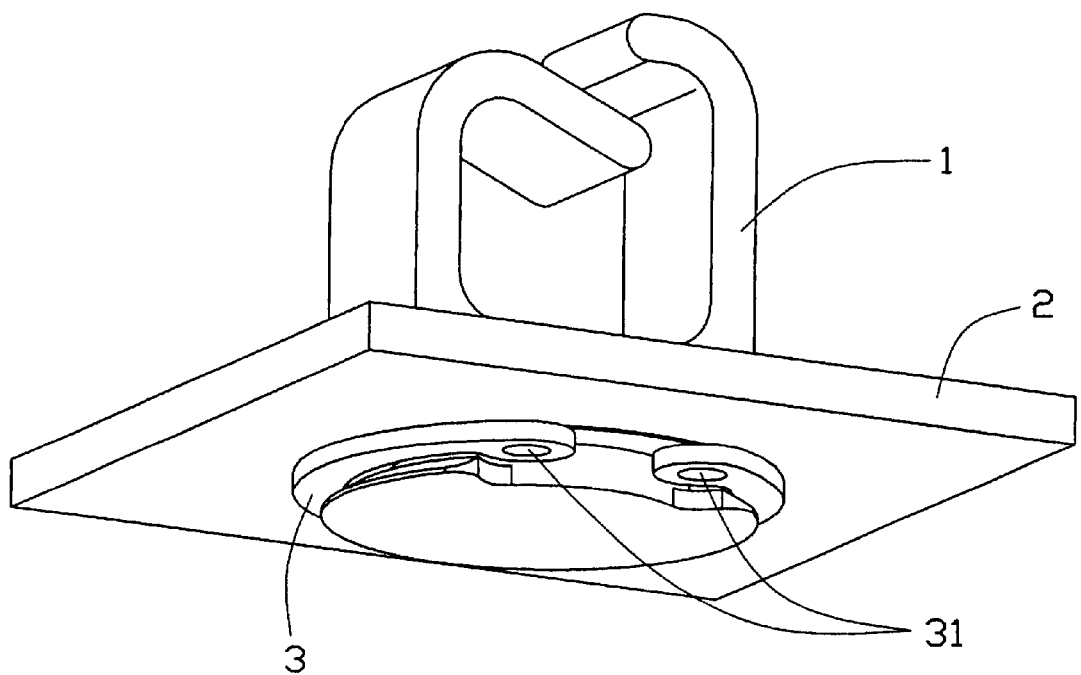
FIG. 1 is a perspective view of an optical fiber cable holder in accordance with the present invention attached to a base.
Figure 2:
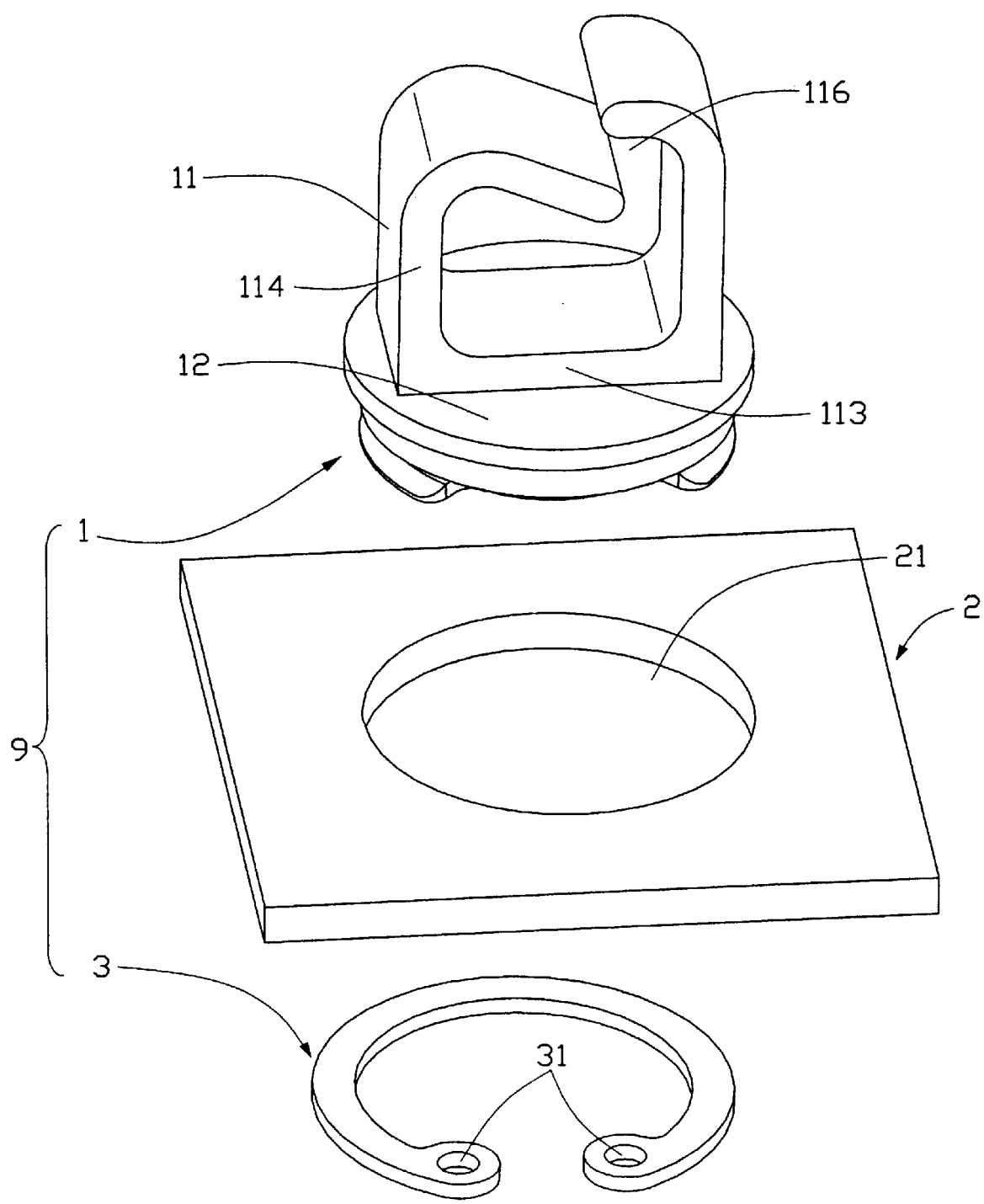
FIG. 2 is an exploded perspective view of FIG. 1, but viewed from another aspect.

Referring to FIGS. 1 and 2, an optical fiber cable holder 9 in accordance with the present invention is integrally made from a single piece of metal or injection molded plastic material. The holder 9 is attached to a base 2.

The base 2 has a circular aperture 21 defined in a middle portion thereof, for engagingly receiving the holder 9. The base 2 may form part of a light transmitting device, or may be separately formed as a member for mounting on a light transmitting device.

The holder 9 comprises a main body 1 and a coupler 3. The main body 1 includes a holding member 11 and a fixing member 12. The holding member 11 comprises a base portion 113, and a pair of holding arms 114 respectively extending upwardly from opposite sides of the base portion 113. Each holding arm 114 has a gradual bend at a terminal portion thereof. However, configurations of the bends of the two holding arms 114 are different from each other. The holding arms 114 are elastically deformable. A receiving opening 116 is defined between the terminal portions of the holding arms 114. Optical fiber cables 4 are received through the receiving opening 116 and arranged on the base portion 113 (see FIG. 5).

Figure 3:
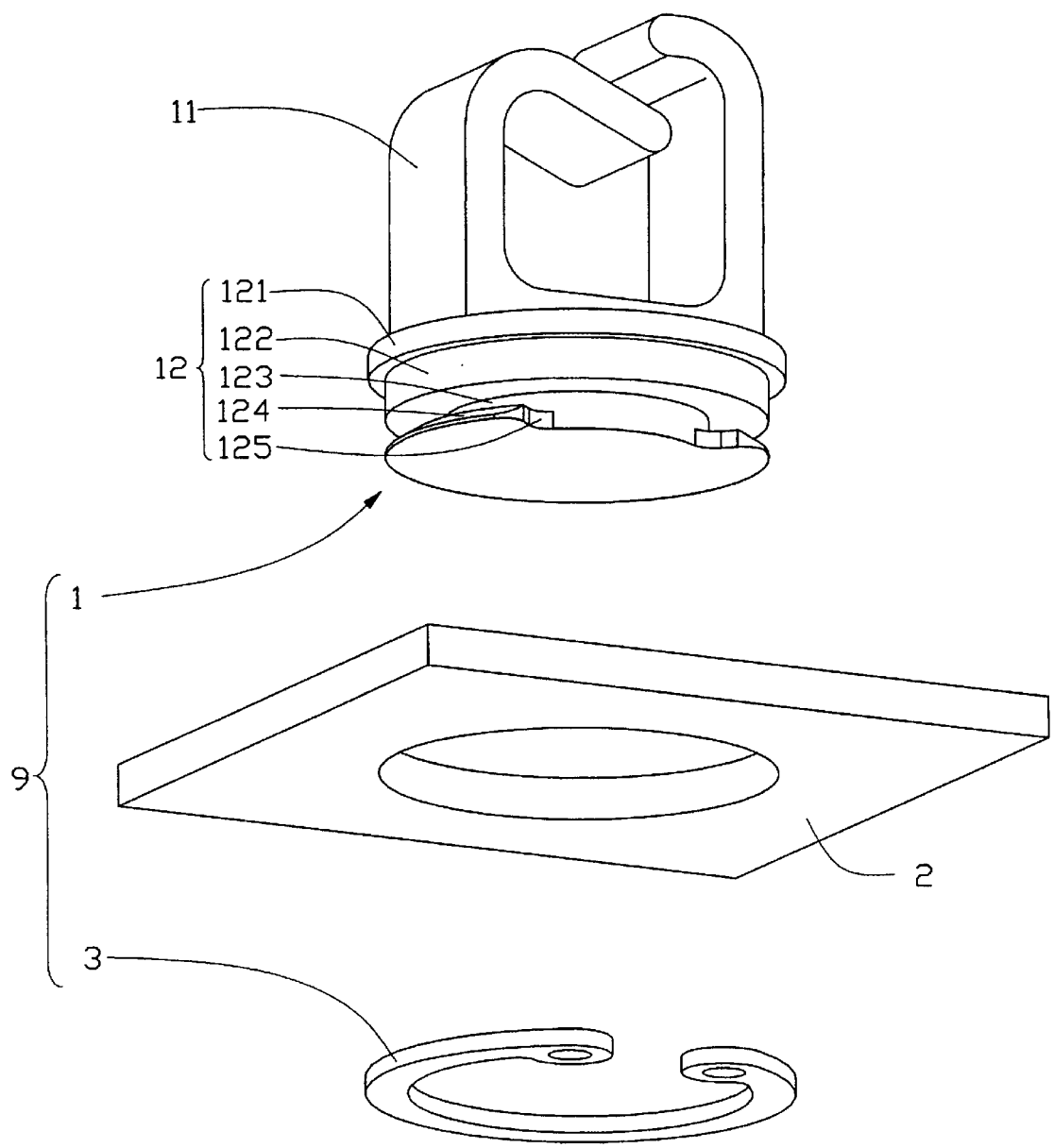
FIG. 3 is an exploded perspective view of FIG. 1.

Referring particularly to FIG. 3, the fixing member 12 is generally cylindrical, and integrally formed with the holding member 11. The fixing member 12 comprises a support panel 121, a pivot portion 122 depending from the support panel 121, and a stop chassis 124 depending from the pivot portion 122. A diameter of the support panel 121 is greater than a diameter of the aperture 21 of the base 2. A diameter of the pivot portion 122 is slightly less than the diameter of the aperture 21. An annular groove 123 is defined between the pivot portion 122 and the stop chassis 124. A cutout 125 is defined in stop chassis 124.

Referring back to FIG. 2, in the preferred embodiment, the coupler 3 is a spring ring having an opening (not labeled). A pair of holes 31 is defined respectively in opposite ends of the coupler 3, for facilitating removal of the coupler 3 from the main body 1.

Figure 4:
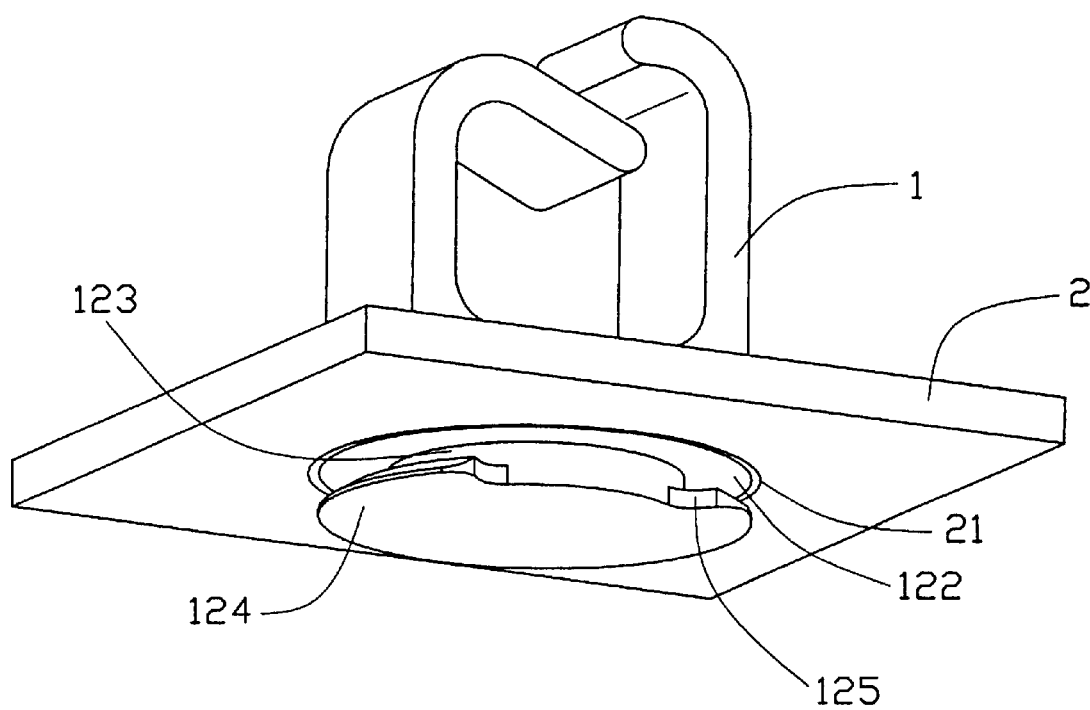
FIG. 4 is similar to FIG. 1, but not showing a coupler of the optical fiber cable holder.

Referring to FIG. 4, in use, the fixing member 12 of the main body 1 is passed through the aperture 21 of the base 2. The support panel 121 is supported on the base 2. The coupler 3 is resiliently secured in the groove 123 of the fixing member 12 below the base 2, to retain the main body 1 on the base 2. The pivot portion 122 is freely rotatable within the aperture 21.

Figure 5:
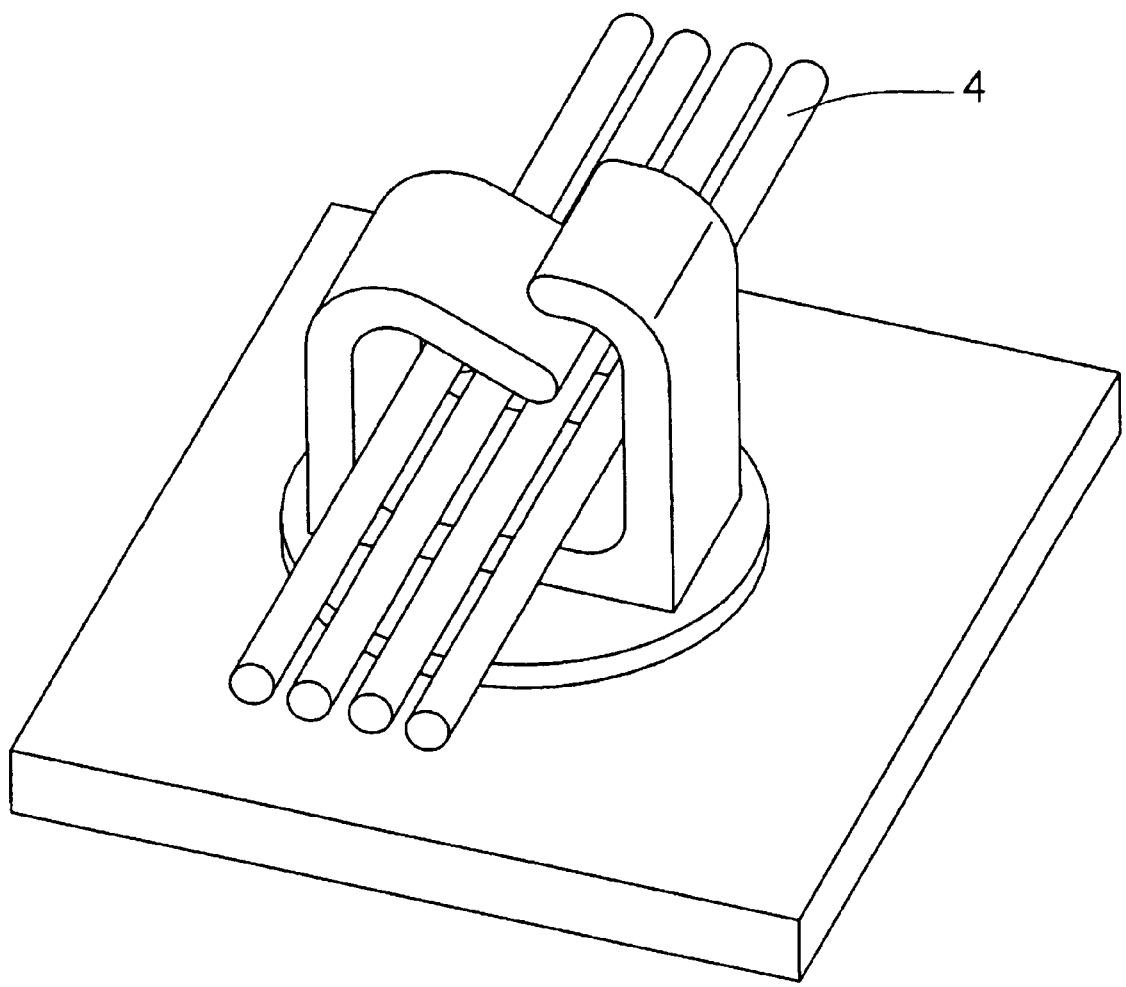
FIG. 5 is similar to FIG. 1, but viewed from another aspect and showing optical fiber cables retained in the optical fiber cable holder.

Referring to FIG. 5, the holding arms 114 retain the fiber cables 4 in the main body 1. Because the holding arms 114 are elastically deformable, the holder 9 can hold varying amounts and varying sizes of fiber cables 4. In addition, because the holder 9 is rotatable, the retained fiber cables 4 can be turned in various directions according to changes made in a position of an associated light transmitting device in a communications network. This prevents excessive bending or pulling of the fiber cables 4.

In removing the holder 9 from the base 2, a tool (not shown) is inserted into the holes 31 of the coupler 3. The coupler 3 is resiliently expanded so that it can be removed from the groove 123 of the main body 1. The main body 1 is then withdrawn from the aperture 21 of the base 2.

It should be understood that various changes and modifications to the presently preferred embodiment described herein will be apparent to those skilled in the art. Such changes and modifications may be made without departing from the spirit and scope of the present invention and without diminishing the present invention's advantages. Thus, it is intended that such changes and modifications be covered by the appended claims.

What is claimed is:

1. An optical fiber cable holder adapted for attachment to a base, the optical fiber cable holder comprising:

a holding member for holding fibers therein;

a fixing member integrated with the holding member, the fixing member comprising a pivot portion adapted for being rotatably received in the base; and a coupler attached to the fixing member for fastening the fixing member to the base.

2. The optical fiber cable holder as described in claim 1, wherein the fixing member further comprises a stop chassis extending from the pivot portion, and a cutout is defined in the stop chassis.

3. The optical fiber cable holder as described in claim 2, wherein the fixing member further comprises an annular groove defined between the pivot portion and the stop chassis.

4. The optical fiber cable holder as described in claim 1, wherein the holding member comprises a base portion and a pair of holding arms.

5. The optical fiber cable holder as described in claim 1, wherein the fixing member further comprises a support panel adapted to support the optical fiber cable holder on the base.

6. The optical fiber cable holder as described in claim 1, wherein the coupler is a spring ring having an opening.

7. An optical fiber cable holder adapted for attachment to a base, the optical fiber cable holder comprising:

a holding member for holding fibers, the holding member comprising a base portion and a pair of holding arms, each of the holding arms having a bent terminal portion, a receiving opening being defined between the terminal portions of the holding arms;

a fixing member integrally formed with the holding member, the fixing member comprising a pivot portion adapted for being rotatably received in the base; and a coupler adapted for fixing the fixing member to the base.

8. The optical fiber cable holder as described in claim 7, wherein the fixing member further comprises a stop chassis extending from the pivot portion, and a cutout is defined in the stop chassis.

9. The optical fiber cable holder as described in claim 8, wherein the fixing member further comprises an annular groove defined between the pivot portion and the stop chassis.

10. The optical fiber cable holder as described in claim 7, wherein the fixing member further comprises a support panel adapted to support the optical fiber cable holder on the base.

11. The optical fiber cable holder as described in claim 7, wherein the coupler is a spring ring, and a pair of holes is respectively defined at opposite ends of the spring ring.

12. An optical fiber cable assembly comprising:

a holder comprising a base portion with at least one resilient arm extending therefrom to form a retaining space for have a plurality of optic fibers retainably extending therethrough in a horizontal direction;

a fixing member integrally formed under the base portion with a supporting panel seated upon a substrate and with under said supporting panel a pivot portion rotatably received in a hole in said substrate;

an annual groove formed in the fixing member below the pivot portion; and a coupler inserted into the annual groove and substantially diametrically larger than the hole to cooperate with the supporting panel to sandwich the substrate therebetween.

* * * * *